Oct. 17, 1933.  E. C. BREWER  1,930,948
MIXER
Filed Oct. 1, 1931  2 Sheets-Sheet 1
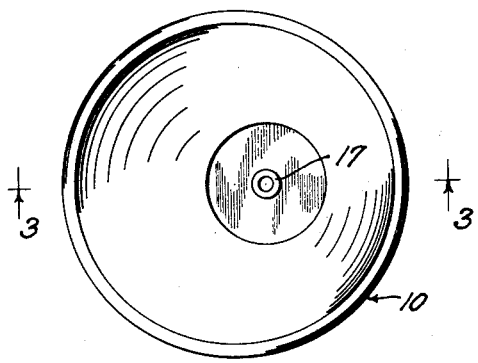
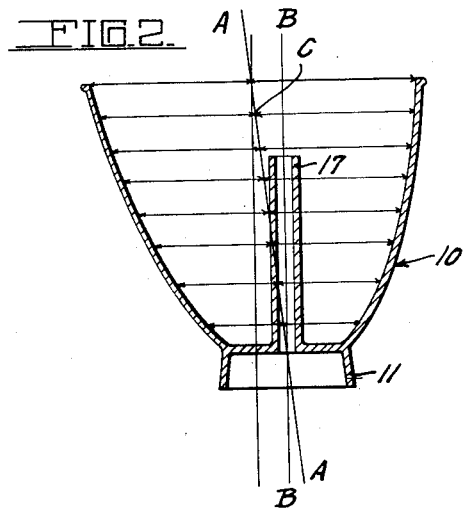
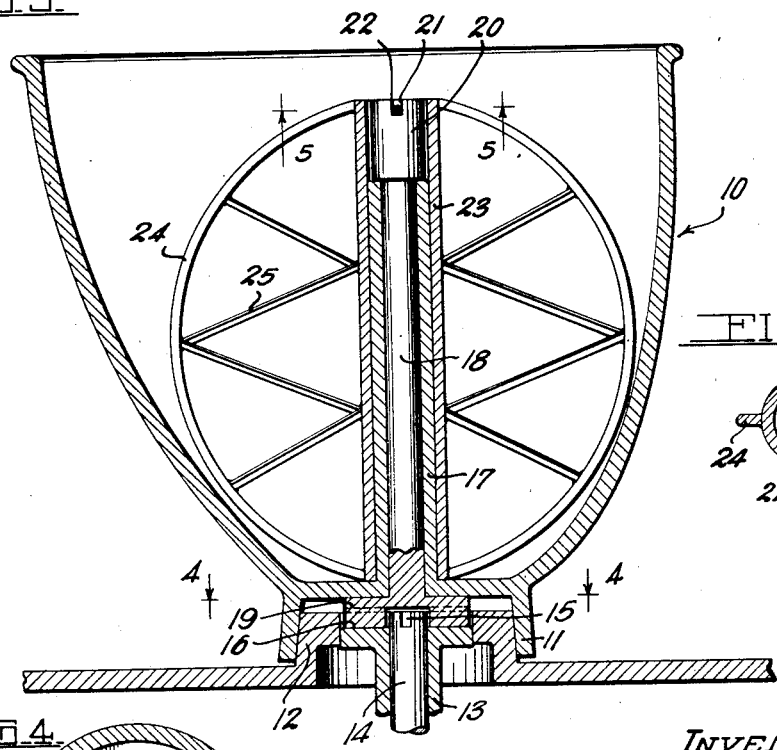
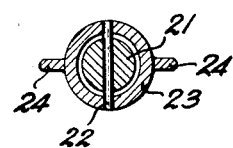
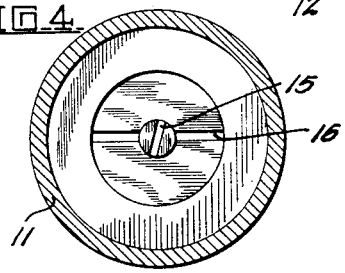
INVENTOR
E. C. BREWER
BY Hazard and Miller
ATTORNEYS Oct. 17, 1933.  E. C. BREWER  1,930,948
MIXER
Filed Oct. 1, 1931   2 Sheets-Sheet 2

INVENTOR
E. C. BREWER
By Hazard and Miller
ATTORNEYS

Patented Oct. 17, 1933

1,930,948

UNITED STATES PATENT OFFICE 1,930,948

MIXER

Everett C. Brewer, Los Angeles, Calif.

Application October 1, 1931. Serial No. 566,297

2 Claims. (Cl. 259—108)

This invention relates to improvements in mixers and concerns a mixing device which has been primarily designed to be used in conjunction with the kitchen appliance machine disclosed in my prior Patent No. 1,823,314, dated September 15, 1931.

An object of the invention is to provide an improved mixing device consisting of a bowl in which there is a rotary agitator, this agitator being adapted to be driven from the bottom, rendering the device suitable for use in conjunction with the kitchen appliance machine above mentioned. The improved mixer is so designed that the agitator is detachably connected to a spindle which rotates within a tube extending upwardly from the bottom of the bowl. By this construction no leakage can take place through the bottom of the bowl around the spindle and at the same time the agitator can be readily removed for pouring and cleaning purposes.

Another object of the invention is to provide a mixer having a bowl within which there is a rotary agitator rotatable about an axis other than the axis of symmetry of the bowl. In this manner the path of the rotary agitator or beater sweeps closer to certain walls of the bowl than others. These other walls which are more spaced from the path of the agitator form a locality within which the contents may temporarily collect and from which locality they may be again fed to the path of the agitator. Such a construction is highly advantageous for if the path of the agitator were always equidistant from the walls of the bowl, the contents would be merely plastered against the walls of the bowl without being effectively beaten or mixed by the rotating agitator.

A further object of the invention is to provide a novel bowl design for accomplishing the above function.

Another object of the invention is to provide a mixer consisting of a bowl adapted to be applied to the same seat to which a number of different appliances may be applied and which, on being applied to the seat, will be connected to a drive mechanism for rotating its agitator which has associated with the bowl of the mixer near the seat an electric heating element. In some instances it is desirable to be able to heat the contents of the bowl or to maintain them in a heated condition while they are being agitated, beaten, or mixed, by the rotating agitator.

With the foregoing and other objects in view, which will be made manifest in the following detailed description, and specifically pointed out in the appended claims, reference is had to the accompanying drawings for an illustrative embodiment of the invention, wherein:

Fig. 1 is a top plan view of the improved mixer, the agitator being illustrated as having been removed therefrom.

Fig. 2 is a diagrammatic view illustrating the design of the bowl of the improved mixer.

Fig. 3 is a vertical section through the improved mixer, illustrating it as having been applied to the kitchen appliance machine.

Fig. 4 is a sectional view taken substantially upon the line 4—4 upon Figure 3.

Fig. 5 is a sectional view taken substantially upon the line 5—5 upon Figure 3.

Figure 6:
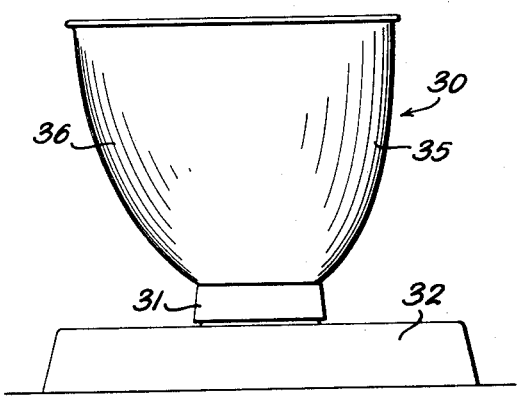
Fig. 6 is a view in side elevation illustrating a modified form in applied position.

Referring to the accompanying drawings, wherein similar reference characters designate similar parts throughout, the improved mixer comprises a bowl generally designated at 10 having a base 11 shaped to fit over and snugly rest upon an upstanding seat 12. The seat 12 is on the top of the housing of the kitchen appliance machine disclosed in my prior patent and centrally thereof there is a sleeve 13 within which there is a spindle 14. The sleeve 13 and the spindle 14 are driven by a motor, not shown, in the same direction but at different speeds. As illustrated, the sleeve 13 is driven at a lower speed than the spindle 14. Clutch elements are provided at the tops of the sleeve and spindle respectively, these being indicated as being of diametric slots or grooves 15 and 16. A tube 17 extends upwardly from the bottom of the bowl and is vertically disposed. Within this tube there is a spindle 18 having at its bottom a clutch element generally designated at 19 which is complementary to sleeve 13 so that when the bowl is positioned on the seat 12 spindle 18 will be automatically connected to sleeve 13 so as to be rotated thereby. The upper end of the spindle 18 is enlarged as indicated at 20, the enlargement resting on top of tube 17. The enlargement has a diametrical slot 21 formed therein adapted to receive a diametrical pin 22 on the agitator. The agitator comprises a tubular hub or center portion 23 which telescopically fits over tube 17. Any preferred design of agitator may be employed, however, I have illustrated it as having semi-circular side frames 24 which are connected to the hub 23 by webs or vanes 25. Whenever it is desired to pour the contents from the bowl or to clean the bowl, the agitator can be easily removed. This is accomplished by merely lifting the agitator upwardly and sliding it off of the vertical tube 17. Conversely in applying the agitator it is merely telescopically slipped on to the tube 17 and the diametrical pin 22 across the upper end of the hub positioned in slot 21.

As clearly shown in Figure 3, one side of the bowl has a greater inclination or sharper curvature than the other. The design of the bowl may be briefly described as follows. Referring particularly to Figure 2, I have illustrated the bowl as having been divided by horizontal planes, thus establishing a series of elements extending horizontally through the bowl. Each element of the bowl is substantially circular, that is the portion of the bowl intersected by the lowermost plane will be virtually a perfect circle. Likewise every element of the bowl above the lowermost plane will be virtually a perfect circle. The radii of the circles progressively increase from the bottom to the top. The centers of the circles, however, are arranged on a common inclined axis illustrated at A—A with the centers being indicated thereon at C. The longitudinal axis through the tube which is coincidental with the axis of rotation of the agitator is indicated at B—B. The axis A—A, which is an inclined axis, may be regarded as the axis of symmetry of the bowl in that the centers of the circular elements are all located upon it. The axis of rotation of the agitator is located at B—B and forms an angle with the axis A—A. Consequently by this arrangement the bowl has the appearance of having been bulged outwardly at one side as illustrated in Figures 1, 2 and 3. The path of the agitator during its rotation consequently will sweep nearer one side of the bowl than the other so that the left hand side of the bowl, as illustrated in Figure 3, forms a chamber at the side of the agitator in which ingredients to be mixed may collect temporarily and from which they will again flow into the path of the agitator. In this manner the ingredients will be thoroughly mixed and beaten together by the rotary agitator rotating about a vertical axis instead of being merely plastered against the walls of the agitator, which is apt to be the case where the walls are all equidistant from the path of the agitator. Other designs of bowls for accomplishing substantially the same function may be employed but I find a bowl having the above described design preferable.

Figure 7:
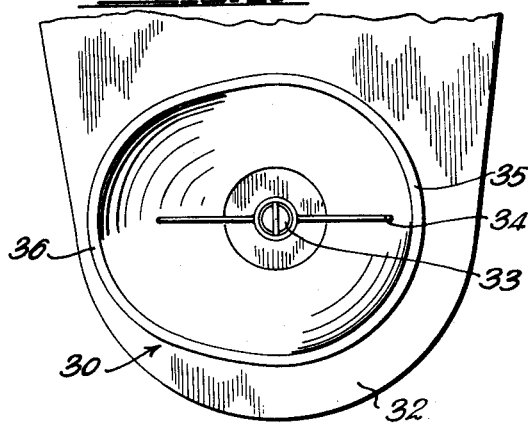
Fig. 7 is a top plan view of the modification.

In Figures 6 and 7 there is a modified form of bowl construction, the bowl generally being designated at 30, having a base 31 which can be applied to the seat of the kitchen appliance machine indicated at 32. This type of bowl has an upstanding tube on its bottom within which there is a rotating spindle 33 and over which may be telescoped the agitator or stirrer 34. The construction of the tube, spindle and agitator, may be substantially the same as that illustrated in Figure 3. In this design of bowl, however, one portion of the bowl indicated at 35 is in the nature of a paraboloidal surface of revolution, the axis of which is coincident with the axis of the spindle 33. The opposite side of the bowl, indicated at 36, is bulged outwardly so that the walls of this side of the bowl are somewhat more spaced from the agitator or stirrer 34 than the walls of portion 35. In this construction of bowl, which is somewhat different in design from that illustrated in Figure 2, substantially the same functions and advantages occur, namely, the agitator may sweep closely adjacent to walls of portion 35 but will be more spaced from the walls of portion 36, thus providing a locality in which the ingredients to be mixed may temporarily collect and be subsequently fed into the path of the rotating agitator.

Figure 8:
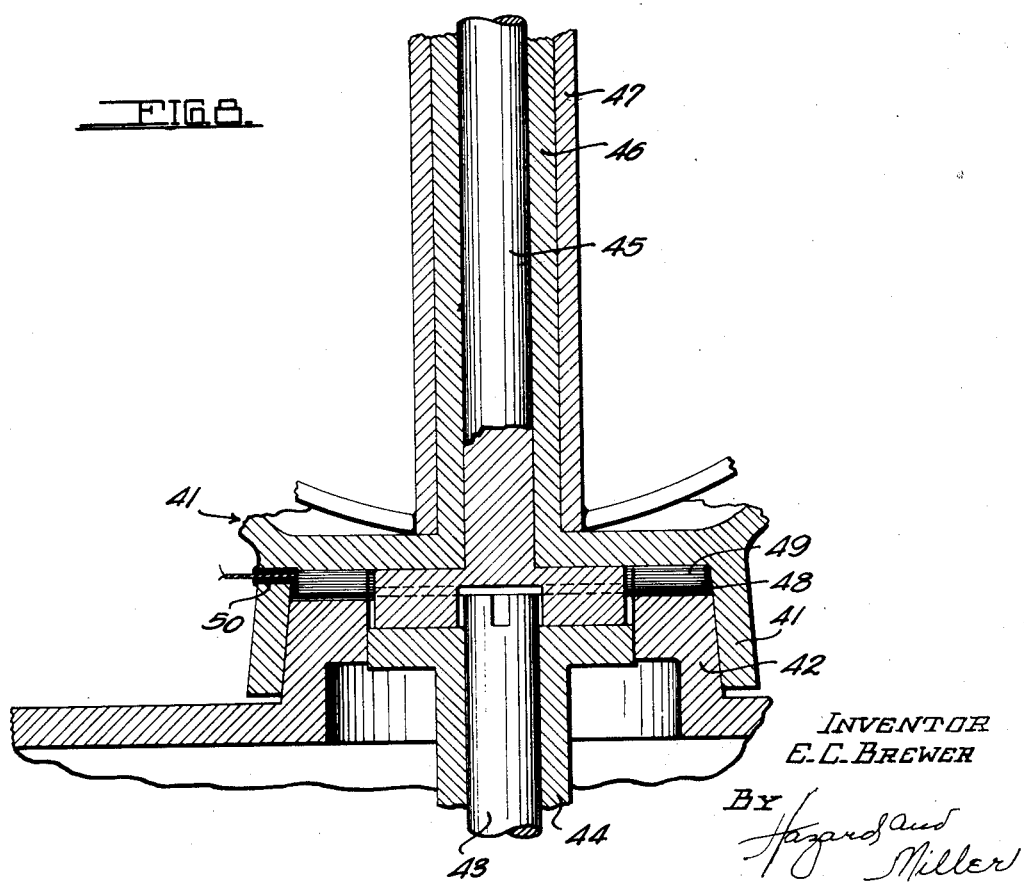
Fig. 8 is a sectional view illustrating a further modification.

In Figure 8 there is illustrated another modified form of construction, the bowl of which is indicated at 40, having a base 41 which can be positioned over the seat 42 on the kitchen appliance machine, which seat is adapted to receive any one of a number of different appliances. The spindle of the machine is indicated at 43 and the sleeve at 44. The spindle and sleeve have clutch elements which may be caused to be engaged with the spindle 45 on the bowl which rotates within the upstanding tube 46 and drives the agitator 47. The spindle 45 is shown as having been connected to the sleeve 44 although in different forms embodying the invention it may be connected with spindle 43. On the under side of the base there is secured a suitable housing 48 within which there is a heating element 49. This heating element may be of any preferred construction and may be supplied with electric current by any suitable leads. I have illustrated the leads as extending outwardly through the side of the base as indicated at 50. In this type of construction the bowl may be of any desired shape and when the contents thereof are being mixed or beaten, they may be warmed continually by the heating element 49.

From the above described constructions it will be appreciated that a simple, novel and advantageous mixing device is provided which will thoroughly mix and beat ingredients. I find that the above described constructions lend themselves admirably to beating cakes and the like.

Various changes may be made in the details of construction without department from the spirit or scope of the invention as defined by the appended claims.

I claim:

1. A mixer comprising a bowl, an agitator rotatably mounted in the bowl, said agitator being oval in shape and having a height and width approaching the height and diameter of the interior of the bowl, said bowl having walls part of which conform to a surface of revolution having an axis coincident with the axis of rotation of the agitator, the other walls of the bowl being bulged outwardly therefrom, and means for rotating the agitator.

2. A mixer comprising a bowl, an agitator rotatably mounted in the bowl, said agitator being oval in shape and having a height and width approaching the height and diameter of the interior of the bowl, some of the walls of the bowl being disposed near the path of the agitator and others being spaced therefrom, and means for rotating the agitator.

EVERETT C. BREWER.